Dec. 22, 1942.    H. E. GOLDSTINE    2,306,052
PHASE MODULATION CIRCUIT
Filed Dec. 21, 1940

PHASE RELATION OF Eg AND Ip WITH PLATE OF TUBES 40 AND 42

INVENTOR
HALLAN E. GOLDSTINE
BY
ATTORNEY

Patented Dec. 22, 1942

2,306,052

UNITED STATES PATENT OFFICE 2,306,052

PHASE MODULATION CIRCUIT

Hallan Eugene Goldstine, Rocky Point, N. Y., assignor to Radio Corporation of America, a corporation of Delaware Application December 21, 1940, Serial No. 371,075

5 Claims. (Cl. 179—171.5)

This application concerns wavelength modulation systems. In particular, this application concerns a wavelength modulation system comprising an electron discharge device with electrodes connected in a crystal-controlled oscillation generating circuit and other electrodes connected with an output circuit electronically coupled to the oscillation generating circuit with the reactance tube modulator comprising two electron discharge systems in reactive circuits coupled to the output circuit of the discharge tube wherein the oscillations are generated and also connected to a source of potentials representative of the signals it is desired to modulate the generated oscillations with.

In describing my invention in detail, reference will be made to the attached drawing wherein;

Fig. 2 is a simplified circuit representing the reactance tube modulators of Fig. 1; while.

Figure 1:
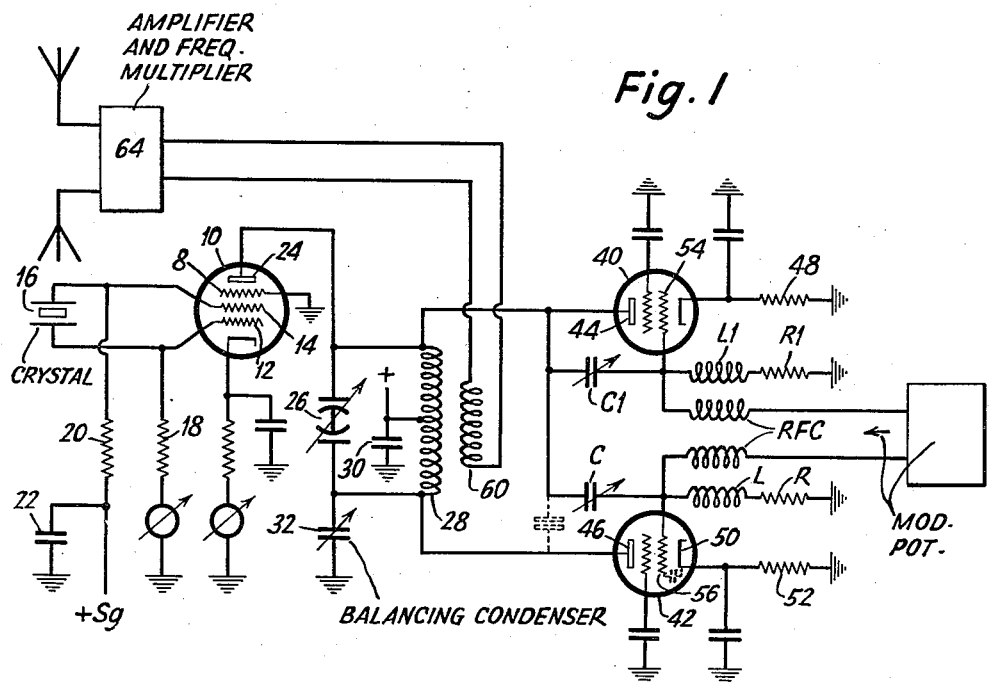
Fig. 1 is a circuit diagram illustrating the essential features of a wavelength modulator arranged in accordance with my invention.

Referring to Fig. 1, tube 10 has its first and second grids 12 and 14 connected with a piezoelectric crystal 16 to form an oscillation generating circuit the frequency of the oscillation of which is dependent nearly entirely on the dimensions of the crystal 16. The electrode 12 is connected to ground by a resistance 18 while the electrode 14 is connected to a positive point on a source of direct-current potential by way of a resistor 20. The source (not shown) has its negative terminal grounded and is shunted by a bypass condenser 22. The anode 24 of tube 10 is connected with a tank circuit comprising a variable condenser 26 and an inductance 28 connected in parallel. A point on the inductance 28 is connected to a source of direct-current potential which may be the source mentioned above or a separate source. This lead is filtered by a bypass and blocking condenser 30 connected to ground.

Adjacent terminals of condenser 26 and inductance 28 are connected to the anode 24. The opposite terminals of the capacity 26 and inductance 28 in the tank circuit are connected by a balancing condenser 32 to ground. A purpose of the condenser 32 is to electrically balance the sides of the tank circuit with respect to its ground or mid-point connection through condenser 30.

Oscillations are produced in the circuits connected with electrodes 12 and 14 of tube 10 of a frequency determined in large part by crystal 16. These oscillations are supplied to the tank circuit connected with the anode 24 substantially by the electron stream only of the discharge device 10. The tank circuit and the anode 24 are shielded from the oscillation generating circuits by a grounded electrode 8 arranged between the electrodes 14 and 24 and connected directly to ground.

The modulator tubes 40 and 42 have their anodes 44 and 46 connected to spaced points on the inductance 28 of the tank circuit. One end of the inductance 28, for example, the anode end thereof, is connected by a phase shifting circuit comprising condenser C1 and inductance L1 and bias resistance R1 to the cathode 46 by way of ground and bias resistance 48. A second phase shifting circuit comprising condenser C, inductance L and resistance R connects the same point on the tank circuit to the cathode 50 of tube 42 by way of ground and bias resistance 52. The grid electrodes 54 and 56 are connected to points on the phase shifting circuits C1, L1, R1, and C, L, R, respectively, to excite the said grid electrodes by voltages of substantially like phase but of a phase displaced about 90 degrees with respect to the phase at the anode 44, and at its point of connection to inductance L. Since the anodes 44 and 46 are connected to opposite ends of inductance 28, the phase of the excitation on the grids 54 and 56 is also displaced 90 degrees with respect to the voltage on the anode 46. These tubes are fed so that the phase of the voltages on the grids of the tubes are displaced essentially 90 degrees relative to their respective plate voltages. In one of the tubes the grid voltage leads the plate voltage by 90 degrees and in the other tube the grid voltage lags the plate voltage by 90 degrees. The grid voltage is fed from one side of the plate circuit to both tubes and since the two plates are 180 degrees out of phase this makes the grid voltages appear in their proper relationship to make one tube appear as capacitive and the other tube inductive reactance. As the reactances of the tubes are varied by means of the audio input, one tube will increase inductive reactance and the other will decrease capacitive reactance, and vice versa.

Figure 2:
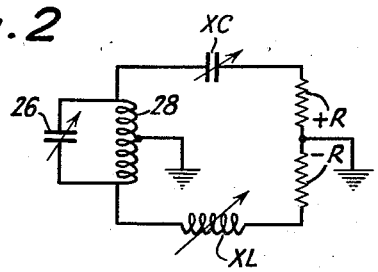
Figure 3:
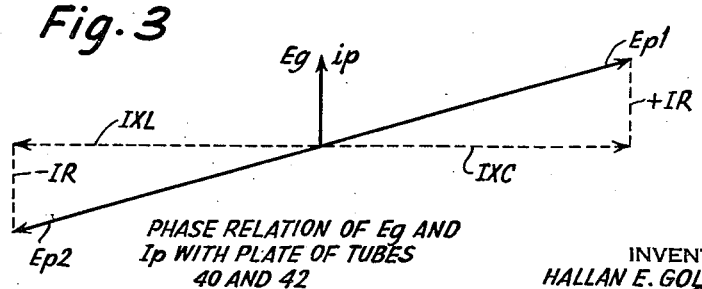
Fig. 3 is a vector diagram used in Fig. 2 to explain the operation of the arrangement in Fig. 1.

A better understanding of the method in which the required phase quadrature relation between the voltages on the grids and anodes of the reactance tube systems will be had by reference to Figs. 2 and 3 wherein in Fig. 2, XC represents the variable reactance formed (between the anode and cathode) by one of the tubes, say tube 40, in shunt to one portion of the inductance 28, while XL represents the reactance formed (between the anode and cathode) of the other tube, say 42, in shunt to the other portion of the inductance 28. XC and XL are complex reactances having no exact electrical equivalent but can be considered capacitive and inductive, respectively. Thus, the tubes 40 and 42 act as a current limiting condenser or inductance the value of which depends on the current through the tubes. The resistances +R and —R are the equivalent series resistance of the equivalent plate-to-ground resistance of tubes 40 and 42. Looking into the plate circuit of a pentode, there is some change in plate-current with plate voltage giving an equivalent high shunt resistance, also if the grid voltage is not exactly 90 degrees out of phase with the plate voltage, this will also present some equivalent loading. By making one tube negative resistance equivalent to the positive resistance on the other tube, this loading effect can be cancelled across the circuit 28—28.

In Fig. 3, Ep1 and Ep2 represent the phase opposed voltages on the anodes 44 and 46. These voltages appear from anode 44 to ground—ground to anode 46. Since these voltages are not 90 degrees out of phase with the plate current, they represent a capacity reactance in series with a resistance and an inductive reactance in series with a negative resistance.

Due to high frequency current in the tank circuit, including inductance 28, voltages are produced on the anodes of tubes 40 and 42 with respect to the cathodes of these tubes. These voltages are represented by Ep1 and Ep2 in Fig. 3. Since the two phase shifting circuits C, L, R, and C1, L1, R1 are subjected to one of these plate voltages, each grid is fed a voltage which is advanced substantially 90 degrees with respect to the said plate voltage. In one tube then the grid voltage leads the plate voltage by about 90 degrees, while in the other tube the grid voltage lags the plate voltage by about 90 degrees. This is indicated in Fig. 3 by vector Eg. The current pulses Ip are in phase with the grid voltage Eg as indicated in Fig. 3. As a consequence in one tube, say 40, the pulses of current, ip Fig. 3, which reach the anode lead the anode voltage by about 90 degrees and this complex tube reactance is capacitive in nature. In the other tube, say 42, the pulses of current ip which reach the anode lag the said anode voltage by about 90 degrees and this complex tube reactance is inductive. Varying the intensity of the current pulses varies the values of the complex tube reactances.

Modulation is accomplished by applying modulating potentials from any source, such as, for example, a microphone or a scanner through choking inductances RFC to the grid electrodes 54 and 56 in phase opposition. Increasing the potential on the grid 54 increases the current through the tube 40. Increasing the current through the tube 40 decreases the capacitive reactance provided by the said tube. This is equivalent to adding capacity to the tank circuit. Since the modulation is in phase opposition at this time the current through the other tube, say 42, is decreased thereby increasing the inductive reactance provided by tube 42. This has the effect of adding inductance to the tank circuit. The added capacity and increased inductance shunt the tank winding 28 and alters the tune thereof slightly. Both the added shunt capacity and the higher shunt inductance decrease the resonant frequency of the circuit. Increasing the potential of grid 56 and decreasing the potential on the grid 54 has the opposite effect. Thus, the tubes are controlled to vary the reactance of the tank circuit in accordance with the modulating potentials. This modulates the phase of the oscillatory energy in the tank circuit and the phase modulated oscillatory energy may be utilized directly from the tank circuit through inductance 60 coupled therewith or may be used after amplification and multiplication to the extent required in frequency multipliers and amplifiers in a unit 64.

The condensers C and C1 can be connected to the other end of inductance 28, that is, at the end thereof where the anode 46 is connected.

Although I have shown the electron tube systems 40 and 42 in separate envelopes, it will be understood that the same may be included in a single envelope.

As an example of operation, I may modulate the phase of the oscillatory energy in the tank circuit 26 and 28 through a range of 20°; that is + and —10° so that with a multiplication of 81 in multiplier stages 64, the final phase shift would be ±810° at the output frequency which would give a modulation index of 14.15.

The system as described is essentially a phase modulator but by the use of a corrected modulating potential, that is, one wherein the modulating potentials are modified substantially inversely in accordance with their frequency, an output having essentially the characteristics of a frequency modulated wave may be derived.

What is claimed is:

1. In a phase modulation system, an oscillation generator including, a tube having a plurality of electrodes including a cathode connected in an oscillation generating circuit, and other electrodes including said cathode connected with an output reactance, a pair of electron discharge systems each comprising an electrode serving as an anode, a cathode and a control electrode, connections between spaced points on said output reactance and the electrodes of said systems serving as anodes, a connection between a point on said reactance intermediate said spaced points and the cathodes of said systems, means for impressing voltages from said generating circuits on said control grids which are substantially in phase quadrature relative to the voltages on the anodes of the respective systems, means for electrically balancing said reactance with respect to the point thereon to which the cathodes of said systems are connected and means for modulating the impedances of said systems in phase opposition at signal frequency.

2. In a phase modulation system, an oscillation generator including, a tube having a plurality of electrodes including a cathode coupled in a crystal controlled oscillation generating circuit and other electrodes including said cathode coupled in an output circuit including a reactance, a pair of electron discharge systems each having an anode, a cathode and a control electrode, connections between spaced points on the reactance of said output circuit and the anodes of said systems, a connection between the cathodes of said systems and a point on said reactance intermediate said spaced points, means for impressing on the control grids of said systems alternating-current voltages of phases displaced by substantially 90° relative to the phases of the alternating-current voltages on the anodes of said systems, means for electrically balancing said reactance with respect to said point thereon to which said cathodes of said systems are connected and means for modulating the impedances of said systems in phase opposition at signal frequency.

3. In a wavelength modulation system, an oscillation generator comprising, a tube having a plurality of electrodes including a cathode coupled in a crystal controlled oscillation generating circuit and other electrodes including said cathode coupled in an output circuit including a reactance, said output circuit being coupled to the oscillation generating circuits by way of the electron stream substantially only of said tube, a pair of electron discharge systems each comprising an anode, a cathode and a control electrode, connections between spaced points on the reactance of said output circuit and the anodes of said systems, a connection between a point on said reactance and the cathodes of said systems, a phase shifting circuit connecting the anode of one of said systems to the cathodes of each of said systems, connections between the grids of said systems and said phase shifting circuit, means for electrically balancing said reactance with respect to the point thereon connected to the cathode of said systems and means for modulating the impedances of said systems in phase opposition at signal frequency.

4. In a wavelength modulation system, a circuit including a reactance, means for setting up voltages of carrier wave frequency in said reactance, a pair of electron discharge tube systems each having an electron receiving electrode, an electron flow control electrode and an electron emission electrode, a connection of low impedance to voltages of said carrier wave frequency between a point intermediate the terminals of said reactance and said emission electrodes, a balancing reactance connected between a point on said first reactance spaced from said first point and said first point for electrically balancing the said first reactance with respect to said first point, means coupling points of substantially opposite carrier frequency voltage on said reactance to the two electron receiving electrodes of said tube systems, similar phase shifting circuits coupling one of the electron receiving electrodes of said systems to the electron emission electrodes of said systems, a coupling between one of said phase shifting circuits and the electron flow control electrode of one of such said systems, a coupling between the other of said phase shifting circuits and the electron flow control electrode of the other of said systems, and means for modulating the potential on corresponding electrodes of said systems in phase opposition at signal frequency.

5. In a phase modulation system, an inductance and a capacity in a parallel circuit tuned to the frequency of wave energy of carrier wave frequency to be phase modulated, non-symmetrical means for exciting said circuit at said carrier wave frequency, a connection between a point intermediate the terminals of said circuit and a point of low radio frequency potential, means for electrically balancing the terminals of said circuit with respect to said point and means for modulating the phase of the wave energy in said tuned circuit without unbalancing the same with respect to a said point including a pair of electron discharge tubes each having an anode, a control electrode and a cathode, a coupling between one terminal of said circuit and the anode of one of said tubes, a coupling between the other terminal of said circuit and the anode of the other of said tubes, similar phase shifting circuits each including a condenser, an inductance and a resistance in series in the order given connected between the anode of one of said tubes and the cathode of both of said tubes, a connection between the condenser and inductance in one of said phase shifting circuits and the control grid of one of said tubes, a connection between the condenser and inductance in the other of said phase shifting circuits and the control grid of the other of said tubes, a coupling of low impedance to voltages of said carrier wave frequency between the cathodes of both of said tubes and said point on said circuit, and means for modulating the impedances of said tubes in phase opposition at signal frequency.

HALLAN EUGENE GOLDSTINE.